March 17, 1953
J. RABINOW
2,632,141
INSTANTANEOUS REVERSING MOTOR
Filed March 14, 1951
2 SHEETS—SHEET 1
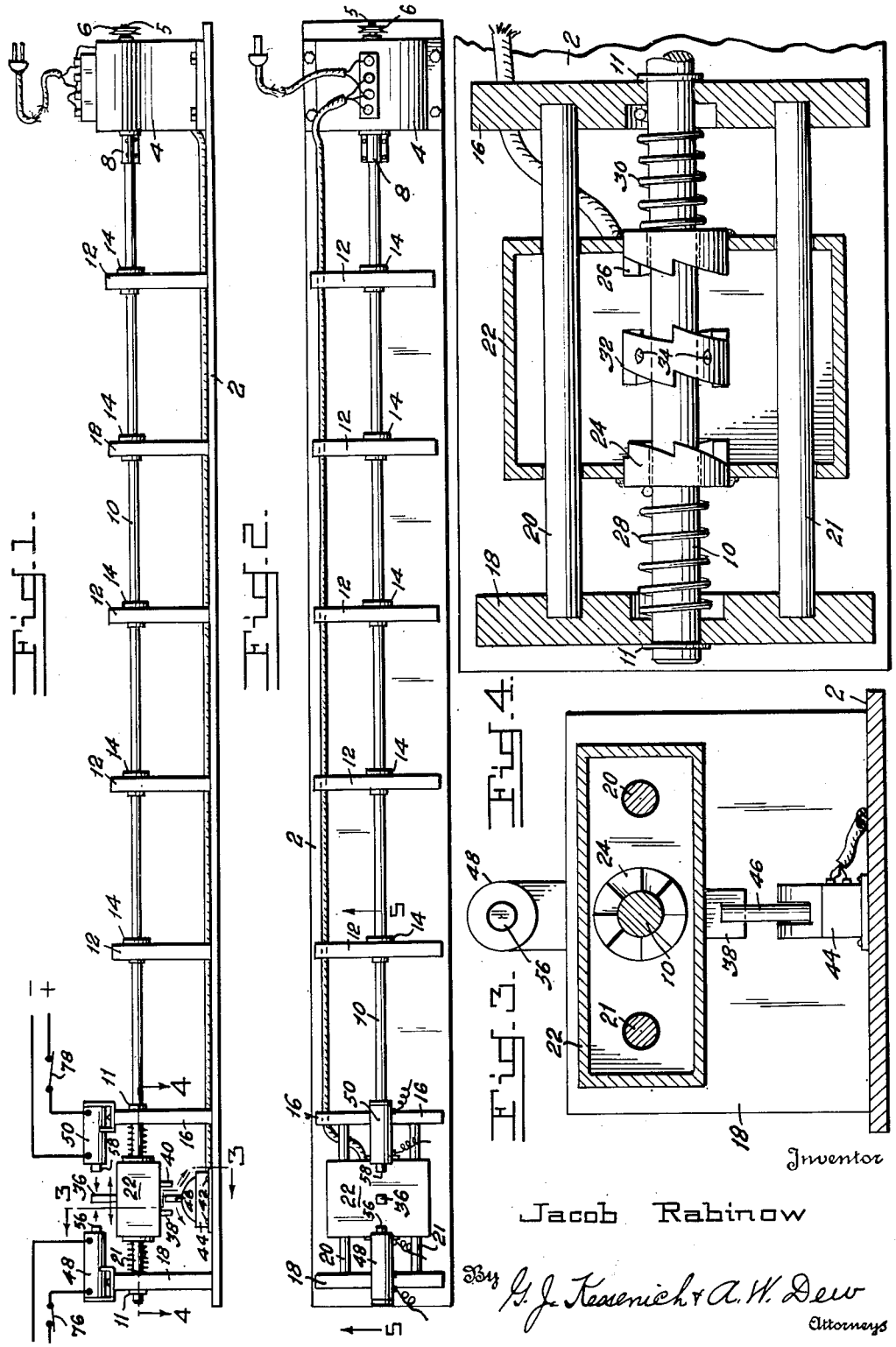
Inventor
Jacob Rabinow
By G. J. Kesenich & A. W. Dew
Attorneys March 17, 1953 J. RABINOW 2,632,141
INSTANTANEOUS REVERSING MOTOR
Filed March 14, 1951 2 SHEETS—SHEET 2

Inventor
Jacob Rabinow
By G. J. Kesenich + A. W. Dew
Attorneys

Patented Mar. 17, 1953

2,632,141

UNITED STATES PATENT OFFICE 2,632,141

INSTANTANEOUS REVERSING MOTOR

Jacob Rabinow, Takoma Park, Md., assignor to the United States of America as represented by the Secretary of the Army Application March 14, 1951, Serial No. 215,615

6 Claims. (Cl. 318—261)

(Granted under Title 35, U. S. Code (1952), sec. 266)

The invention described in the specification and claims may be manufactured and used by or for the Government for governmental purposes without the payment to me of any royalty thereon.

In many motor applications it is important and desirable to reverse the direction of rotation of a motor shaft in as short a time as possible, for example in the electronic digital computer the magnetic tape used as a memory storing means must be rapidly reversed when a signal or impulse is received to initiate this cycle. In motor reversing systems the limiting factor is the mechanical energy stored in the motor shaft, armature and load which collectively act as a flywheel. This energy must be reduced to zero before motion in the other direction can be attempted.

My novel method of motor reversing contemplates in its preferred form the use of a relatively long torsion bar aligned with and secured to the motor shaft and carrying thereon a Janus-faced toothed wheel or clutch member which is sandwiched between and arranged to cooperate with two other toothed wheels or clutch members to stop and reverse the motor shaft and simultaneously to change the flow of electrical energy to the motor windings.

It is therefore a broad object of my invention to provide a novel motor system which is adapted to reverse the direction of rotation of a motor without unnecessarily stressing the structure thereof.

It is a further object of my invention to provide a novel motor system that is adapted to instantaneously reverse the direction of rotation of a motor in response to a predetermined signal.

Other objects and advantages of my invention will appear from the following description of a preferred embodiment thereof taken in conjunction with the accompanying drawings in which:

Figure 1 is a side elevation of the preferred form of my invention.

Figure 2 is a top plan view of my invention.

Figure 3 is an enlarged section view taken on lines 3—3 of Figure 1.

Figure 4 is an enlarged section view taken on lines 4—4 of Figure 1.

Figures 5, 6:
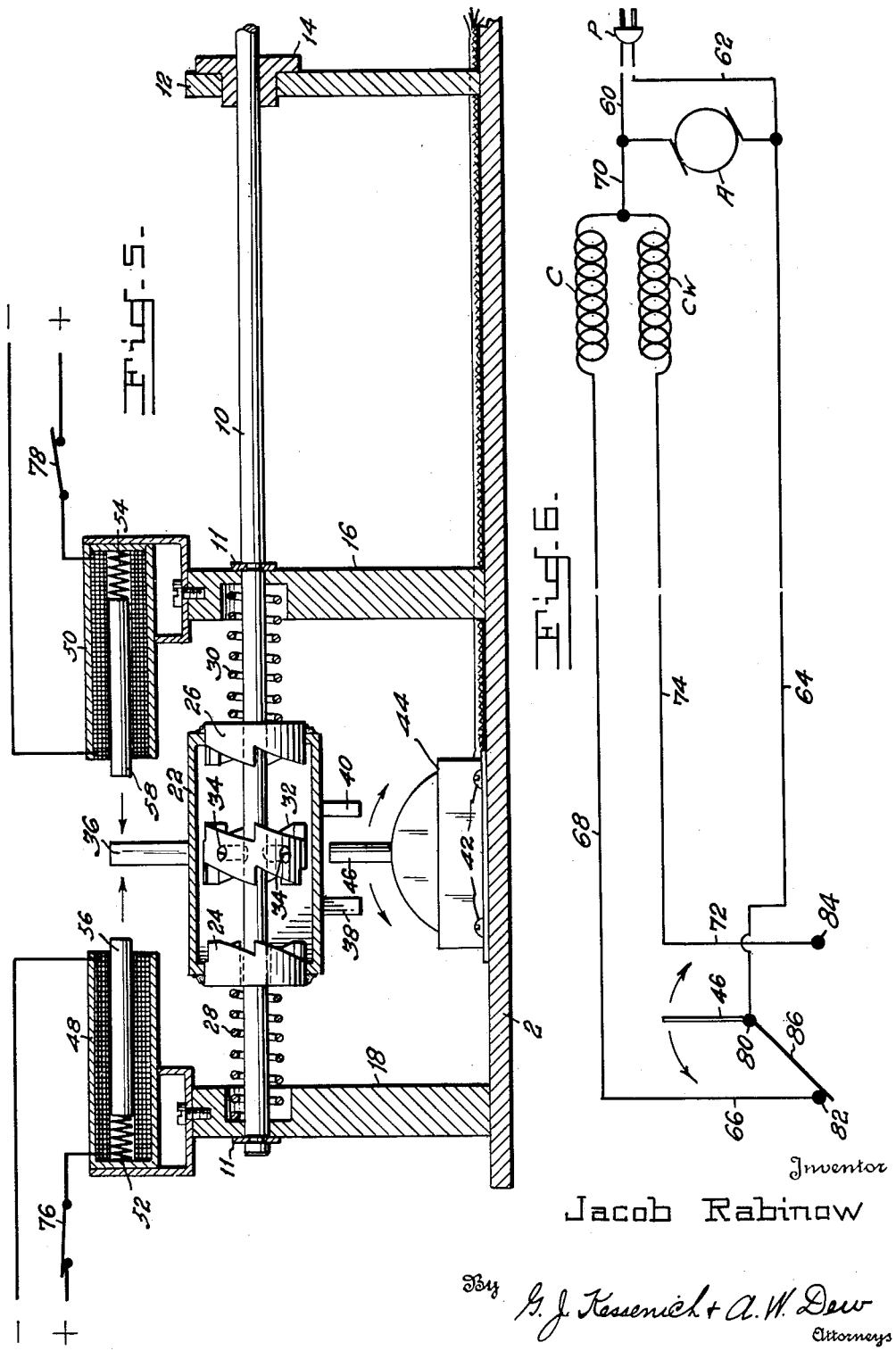
Figure 5 is an enlarged fragmentary view taken on lines 5—5 of Figure 2.
Figure 6 is a schematic wiring diagram of my invention.

With reference to Figure 1 a base plate 2 is provided mounting at one end thereof a motor 4 having a conventional double ended shaft 5 one end of which carries a pulley 6 for driving a load and the other end carrying a coupling 8 fixed to torsion bar 10 which is fixed against axial movement by washers 11. Pillow blocks 12 carrying bearings 14 serve to maintain the bar 10 in proper alignment with the motor shaft and are provided in number and spacing sufficient to give adequate bearing support without introducing excessive friction.

Standards 16 and 18 as best seen in Figure 4 are bridged by pins 20 and 21 for a purpose to be explained. Slidably mounted on rods 20 and 21 for axial motion is rectangular casing 22 having pinned or otherwise firmly affixed thereto toothed wheels or clutches 24 and 26 having inwardly directed toothed surfaces. Torsion bar 10 pierces standards 16 and 18 and passes through rectangular casing 22. Springs 28 and 30 carried on rod 10 bear against casing 22 and maintain it in normal position equidistant between standards 16 and 18. Janus-faced wheel 32 having a toothed surface on each side thereof is securely held to bar 10 by screws 34 or by any other suitable means.

Secured to or made integral with the top surface of casing 22 is finger 36 and similarly secured to or made integral with the bottom surface thereof are ears 38 and 40 for a purpose to be presently explained.

Mounted on base 2 by screws 42 is switch 44 having arm 46 positioned between ears 38 and 40 for cooperation therewith as will appear later. Identical solenoids 48 and 50 are supported by standards 18 and 16 respectively and, as is best seen in Figure 5, have included therein springs 52 and 54 urging cores 56 and 58 toward finger 36. The springs are fastened at both ends, one end to the core and the other to the solenoid housing. The solenoids are energized from any suitable source of voltage, and switches 76 and 78 may be operated by hand or they may be relays for remote operation in the well known manner.

In the wiring diagram shown in Figure 6 electrical energy from a suitable source is applied to the motor, which is the double field shunt wound type for clarity of illustration. The armature A, and a selected field winding are in parallel across the source of voltage P. For clockwise rotation the current flows from line 62, line 64, blade 86, line 66, line 68, field D, line 70, line 60, back to the source. For counterclockwise rotation the CW field is energized from contact 84, line 72 and line 74.

Operation

The operation of my novel motor reversing system is as follows: Assuming that shaft 10 as driven by motor 4 is rotating in a clockwise direction as viewed from the motor, carrying with it double toothed wheel 32. Contacts 80 and 82 are bridged by switch blade 86. It will be understood that the switch has no open position and blade 86 maintains its contact with the pole 82 while handle 46 is normally in the midpoint position. Casing 22 is maintained at its central position under the urging of opposed springs 28 and 30 so that all toothed faces are clear and ears 38 and 40 straddle arm 46 and are separated therefrom. Solenoids 48 and 50 are energized so that the cores 56 and 58 are held against the urging of springs 52 and 54. If switch 78 be opened coil 50 will be deenergized and spring 54 will force core 58 against finger 36 with great force causing casing 22 to move to the left as seen in Figure 5 engaging the teeth on disc 26 with the teeth on the right hand face of wheel 32. Since casing 22 is restrained from any turning motion by pins 20 and 21 the wheel 32 and wheel 26 will lock together. The energy of the rotational inertia of the motor shaft, armature, and load will be caused to enter torsion bar 10 which is now locked near its end and the motor shaft will stop. The elasticity of torsion bar 10 will cause a twisting action which, because of its resilience, will tend to rotate the shaft, armature and motor load in the opposite direction after it has received the rotational energy of those parts. The shape of the teeth, which are cut to prevent rotation in one direction and permit rotation in the other direction, is such that the members tend to be forced out of engagement by the opposite rotation of the shaft which aids spring 28 to return the casing 22 to its middle position. Just prior to the meeting of the teeth on the two engaging members 32 and 26, ear 40 strikes and swings switch arm 46 to the left. This action throws switch blade 86 to its opposite position wherein it engages contact 84 and energizes field CW. It will be readily seen that the forces of the twisting of the torsion bar after the end thereof has been stopped, and the energization of the opposing motor field will combine to rapidly reverse the motor. It has been found in practice that a 1/20 horsepower motor can be reversed through the use of my invention in 1/200 second. Switch 78 is timed to close coincident with or very shortly after the striking of pin 36 by core 58 so that the reenergization of solenoid 50 will draw the core therewithin out of the path of pin 36 in returning to its normal position.

It will be obvious to one skilled in the art that other types of resilient couplings, for example a coil spring, can be used between the motor and the reversing means. It will also be obvious that my invention is applicable to any type of motor whatsoever including the well known hysteresis type wherein the direction of rotation is dependent alone upon the direction of the starting impulse.

Although the invention has been described in connection with the specific details of preferred embodiments thereof, it must be understood that such details are not intended to be limitative of the invention except insofar as set forth in the accompanying claims.

I claim:

1. In a motor reversing system a motor having a shaft and a plurality of field coils selectable at will to change the direction of rotation thereof, a relatively long resilient rod aligned and rotatable with said shaft, a Janus-faced toothed wheel rotating with said rod, an enclosing housing movable axially of said rod pierced by at least one pin disposed parallel to said rod whereby rotation of said housing is prevented, said housing carrying in opposed walls thereof two inwardly facing toothed wheels aligned with said Janus-faced toothed wheel and biased toward a given position, ears projecting from said housing, a switch arranged to select a given field coil, said ears straddling said switch and means for moving said enclosing housing whereby said Janus-faced toothed wheel engages a selected one of said inwardly facing toothed wheels and one of said ears engages and actuates said switch to stop and reverse said motor.

2. In a motor reversing system a motor having a shaft and a plurality of field coils selectable at will to change the direction of rotation thereof, a resilient rod affixed to and aligned with one end of said shaft, a slidable enclosing housing having a normal position and pierced by said rod and further pierced by at least one fixed pin to prevent rotation of the same, engaging means within said housing, and a field selector switch arranged for cooperation with said housing whereby sliding motion thereof to a second position actuates the said switch, said engaging means comprising at least two toothed wheels disposed for relative rotation in the said normal position of the said enclosing housing and for locking engagement in the said second position.

3. A motor reversing system comprising a motor having a resilient elongated shaft rotatable in either direction, toothed means fixed to and rotatable with said shaft and sandwiched between two inwardly facing toothed wheels fixed against rotation but supported for motion with respect to said toothed means, whereby with rotation of said shaft in a first direction, motion of the said toothed wheels carries a selected one thereof into engagement with the said toothed means to stop and release the said shaft for rotation in an opposite direction.

4. A motor reversing system comprising a motor of the type wherein the direction of rotation is dependent upon the direction of the starting impulse and having a resilient elongated shaft, toothed means fixed to and rotatable with said shaft and sandwiched between two inwardly facing toothed wheels fixed against rotation but supported for motion with respect to said toothed means, whereby with rotation of said shaft in a first direction, motion of the said toothed wheels carries a selected one thereof into engagement with the said toothed means to stop the shaft and releasably urge the same in an opposite direction.

5. The invention according to claim 4 wherein the said toothed means is a Janus-faced wheel and the said two inwardly facing toothed wheels are supported in a housing biased toward a normal position and movable axially of said shaft.

6. The invention according to claim 5 including means for moving said housing away from said normal position.

JACOB RABINOW.

REFERENCES CITED

The following references are of record in the file of this patent:

UNITED STATES PATENTS

| Number | Name | Date |
|---|---|---|
| 2,101,665 | Arey et al. | Dec. 7, 1937 |
| 2,105,514 | Welch | Jan. 18, 1938 |
| 2,436,231 | Schellens | Feb. 17, 1948 |